(12) United States Patent  (10) Patent No.: US 10,746,340 B2
Cis et al.  (45) Date of Patent: Aug. 18, 2020

(54) HYDRAULIC PLUG

(71) Applicant: Delavan Inc., Des Moines, IA (US)

(72) Inventors: Marcin Cis, Lutynia (PL); Dariusz Kiełbowicz, Bolesławiec (PL)

(73) Assignee: DELAVAN INC., Des Moines, IA (US)

(*) Notice: Subject to any disclaimer, the term of this patent is extended or adjusted under 35 U.S.C. 154(b) by 0 days.

(21) Appl. No.: 15/887,035

(22) Filed: Feb. 2, 2018

(65) Prior Publication Data
US 2018/0238482 A1 Aug. 23, 2018

(30) Foreign Application Priority Data

Feb. 22, 2017 (EP) .................................... 17461510

(51) Int. Cl.
F16L 55/132 (2006.01)
F16L 55/13 (2006.01)
(Continued)

(52) U.S. Cl.
CPC ............. F16L 55/132 (2013.01); F16J 13/12 (2013.01); F16J 13/14 (2013.01); F16L 55/13 (2013.01); F16B 7/025 (2013.01); F16B 19/1054 (2013.01)

(58) Field of Classification Search
CPC .. F16B 7/025; F16B 19/1045; F16B 19/1054; F16J 13/12; F16J 13/14; F16L 55/12;
(Continued)

(56) References Cited

U.S. PATENT DOCUMENTS 751,902 A * 2/1904 Dodge ................. F16B 37/043
                                                   279/104
2,574,160 A * 11/1951 Zimmerman ....... F16B 19/1045
                                                   220/288

(Continued)

FOREIGN PATENT DOCUMENTS

DE      19949524 C1    4/2001
EP      0364699 A2     4/1990
WO      8504235 A1     9/1985

OTHER PUBLICATIONS

Extended European Search Report for International Application No. 17461510.4 dated Aug. 9, 2017, 5 pages.
(Continued)

Primary Examiner — Mary E McManmon
Assistant Examiner — Richard K. Durden
(74) Attorney, Agent, or Firm — Cantor Colburn LLP

(57) ABSTRACT

A method of manufacturing a hydraulic plug. A shell with a circumferential wall, a sealed end, an open end and an axially extending cavity within is provided in which the cavity is defined by an internal surface with an inner diameter which narrows towards the open end. A head of an expander is inserted into the cavity, the expander further comprising a stem extending from the cavity for applying a tensile force (T) to the head. A sleeve is provided on a stem side of the head extending into the cavity, an end of the sleeve adjacent the head having an inner diameter which is less than a maximum outer diameter of the head. The sleeve is formed by expanding the sleeve by forcing the head into the end of the sleeve through urging the sleeve and/or expander towards the other in an axial direction.

14 Claims, 7 Drawing Sheets

(51) Int. Cl.
*F16J 13/14* (2006.01)
*F16J 13/12* (2006.01)
*F16B 7/02* (2006.01)
*F16B 19/10* (2006.01)

(58) Field of Classification Search
CPC ....... F16L 55/128; F16L 55/13; F16L 55/132; F16L 55/136; F28F 11/02; F28F 11/04; F28F 11/06
USPC ........... 138/89; 215/361, 362; 220/234, 237; 411/40, 41, 43, 70
See application file for complete search history.

(56) References Cited

U.S. PATENT DOCUMENTS

| | | | |
|---|---|---|---|
| 3,525,365 A | | 8/1970 | Meulendyk |
| 3,566,739 A | * | 3/1971 | Lebar ................. F16B 13/0858 411/41 |
| 3,825,146 A | | 7/1974 | Hirmann |
| 4,091,841 A | | 5/1978 | Beneker et al. |
| 4,113,006 A | | 9/1978 | Clapp |
| 4,236,429 A | | 12/1980 | Dolch |
| 4,274,461 A | * | 6/1981 | Yamamoto .............. B60C 27/08 152/167 |
| 4,393,564 A | * | 7/1983 | Martin ..................... F16L 55/13 138/89 |
| 4,436,117 A | * | 3/1984 | Martin ..................... F28F 11/02 138/89 |
| 4,646,816 A | | 3/1987 | Rothstein |
| 4,702,457 A | * | 10/1987 | Lew ...................... F16K 5/0615 251/161 |
| 4,751,944 A | * | 6/1988 | Sinha ...................... B25B 27/02 138/89 |
| 4,754,538 A | * | 7/1988 | Stewart, Jr. ............ B21D 39/06 165/76 |
| 4,771,810 A | * | 9/1988 | Ermold ................. F16L 55/136 138/89 |
| 4,781,501 A | * | 11/1988 | Jeal ........................ B21H 3/022 411/34 |
| 4,818,163 A | * | 4/1989 | Bereiter .............. F16B 13/0858 411/44 |
| 4,986,313 A | * | 1/1991 | Mounet ................. F16L 55/136 138/89 |
| 5,160,226 A | | 11/1992 | Lee, II |
| 5,194,214 A | * | 3/1993 | Snyder .................. F16L 55/132 138/89 |
| 5,201,335 A | * | 4/1993 | Osgood ................... F16B 13/08 137/15.24 |
| 5,205,689 A | * | 4/1993 | Fischer ............... F16B 13/0858 411/15 |
| 6,003,557 A | | 12/1999 | Brelig et al. |
| 6,874,984 B2 | | 4/2005 | Lin et al. |
| 7,314,065 B1 | | 1/2008 | Adelman |
| 8,556,102 B2 | * | 10/2013 | Hersant ................... F16L 55/13 220/233 |
| 9,003,633 B1 | * | 4/2015 | Difante ................. B25B 21/002 29/525.02 |
| 9,022,074 B2 | * | 5/2015 | Fujiwara ................. F28F 11/02 138/89 |
| 2015/0202754 A1 | | 7/2015 | Kirilichin et al. |

OTHER PUBLICATIONS

The Lee Company, Short Series Betaplug Expansion Plug [retrieved on Feb. 2, 2018 (Feb. 2, 2018)]. Retrieved from the internet,URL:http://www.leeimh.com/metal/betaplug-expansion-plugs/betaplug-expansion-plug-SBP.htm.

The Lee Company, Lee Plugs [retrieved on Feb. 2, 2018 (Feb. 2, 2018)]. Retrieved from the internet,URL:http://leecat.theleeco.com/ecatalog/lee-plugs/en.

* cited by examiner

HYDRAULIC PLUG

FOREIGN PRIORITY

This application claims priority to European Patent Application No. 17461510.4 filed Feb. 22, 2017, the entire contents of which is incorporated herein by reference.

FIELD

The present disclosure relates to a method of manufacturing a hydraulic plug, a hydraulic plug and a method of sealing a passage with a hydraulic plug.

BACKGROUND

In many hydraulic devices, holes in hydraulic galleries have to be sealed off. Usually, a hydraulic plug is used to do this which can take several forms.

In one known example, a tapered hole is reamed in a passage to precise dimensions and a tapered plug is pushed in to seal the passage. The plug can comprise two parts, namely a shell which seals against the internal surface of the passage and an expander (often referred to as a "pin") which is driven into the shell by a driver tool. The expander acts as a wedge to expand the shell within the passage to seal it off.

In this first known arrangement, the shell comprises a circumferential wall of uniform thickness that has a tapered surface, both externally and internally, and a sealed end. The reamed taper of the passage, the taper of the outer surface of the shell, the taper of the inner surface of the shell and the taper of the circumferential surface of the expander, are substantially the same. In this way, when the expander is driven into the shell, the tapered outer surface of the shell seals against the reamed taper of the passage and the expander becomes wedged within the tapered cavity of the shell.

Such hydraulic plugs are described in U.S. Pat. No. 5,160,226 and are available from The Lee Company.

In another known example, a hole of constant diameter is reamed in a passage. The transition between the reamed diameter and the passage diameter provides a step that a plug can be pushed up against during installation. As with the previous example, the hydraulic plug comprises a shell with an internal expander ("pin"). With the shell in place within the reamed part of the passage pushed up against the step, the expander can be driven into the shell's cavity to wedge the hydraulic plug in place, sealing it against the internal surface of the passage.

Hydraulic plugs of this type are also available from The Lee Company.

Currently, all of these types of hydraulic plugs, while they work well and have a proven track record, they require some axial force to be applied during installation within a passage of the hydraulic gallery. As a result, the design of the component has to take into consideration that such axial forces during installation need to be balanced, not just externally but also internally. This is particularly the case where the plug engages an internal step in the passage and axial load, which counters the axial force of the expander being driven into the shell, is transferred to the plug e.g., via the corner region of the internal step between the different bore diameters. This can lead to design complexity as well as sometimes to problems of material cracking during installation. In addition, there are the additional process steps of having to ream a tapered hole or hole of larger diameter and the associated problems of removing waste from such a reaming process.

Other plug arrangements are described in U.S. Pat. Nos. 3,825,146, 6,003,557 and US-A-2015/0202754.

It is also known from U.S. Pat. No. 3,525,365 to provide an expanding plug in the form of a pre-assembled cylindrical shell with a tapered bore and a frusto-conical expander. The shell can be held while the expander is pulled via a stem against a constriction in the shell. The stem comprises a weakened region which is configured to break when a predetermined force is applied to the stem. In one configuration, an open end of the shell and a base of the expander faces the pressure-side within the passage; in another, the shell is turned around relative to the frusto-conical surface of the expander so as to present a sealed end of the shell towards the pressure-side of the passage. In both cases, the tapered internal surface of the bore and the counter tapered surface of the expander match so that the expander becomes wedged along its entire length within the shell to secure the plug within the passage.

The present disclosure can be seen to offer an improvement to the expanding plugs described in U.S. Pat. No. 3,525,365.

SUMMARY

Viewed from one aspect, the present disclosure can be seen to provide a method of manufacturing a hydraulic plug. The method comprises providing a shell comprising a circumferential wall, a sealed end, an open end and an axially extending cavity within, the cavity being defined by an internal surface with an inner diameter which narrows towards the open end; and inserting a head of an expander into the cavity, the expander further comprising a stem extending from the cavity for applying a tensile force to the head. A sleeve is provided on a stem side of the head extending into the cavity, an end of the sleeve adjacent the head having an inner diameter which is less than a maximum outer diameter of the head. The method includes a sleeve forming step in which the sleeve is expanded by forcing the head into the end of the sleeve through urging the sleeve and/or expander towards the other in an axial direction, causing the sleeve to overlap a region of the head to present a combined outer diameter which is greater than a minimum inner diameter of the cavity where the cavity narrows towards the open end. The wider outer diameter prevents withdrawal of the head from the cavity.

In addition to one or more of the features described above, or as an alternative, the sleeve may be expanded into abutment with the internal surface of the cavity, causing the expander to become wedged by the sleeve within the cavity, ready for use.

In addition to one or more of the features described above, or as an alternative, further embodiments of the method may include inserting an end of a sleeve into the cavity after the head of the expander has been inserted into the cavity.

In addition to one or more of the features described above, or as an alternative, during the sleeve forming step, the head of the expander may be drawn towards the sleeve to expand the sleeve around the head.

In addition to one or more of the features described above, or as an alternative, during the sleeve forming step the end of the sleeve may be moved towards the head to expand the sleeve around the head.

In addition to one or more of the features described above, or as an alternative, the sleeve may be caused to overlap a region of the head having the maximum outer diameter.

In addition to one or more of the features described above, or as an alternative, the cavity may extend axially a distance greater than the axial extent of the head, and the method may include pulling the head of the expander away from the sealed end of the shell towards the open end of the cavity and into the end of the sleeve to expand the sleeve locally by creating the overlap.

In addition to one or more of the features described above, or as an alternative, the shell may have a cylindrical outer form and may be for installation in a body having a hydraulic passage of constant diameter.

Viewed from a second aspect the present disclosure can be seen to provide a hydraulic plug comprising a shell and an expander. The shell comprises a circumferential wall, a sealed end, an open end and an axially extending cavity opening to the open end. The cavity is defined by an internal surface with an inner diameter which narrows towards the open end. The expander has a head retained within the cavity of the shell and a stem joined to the head and extending from the cavity for applying a tensile force to the head. In the hydraulic plug, a sleeve is provided between the head and the internal surface of the shell. The sleeve overlaps a region of the head to present a combined outer diameter which is greater than a minimum inner diameter of the cavity where the cavity narrows towards the open end. This wider outer diameter prevents withdrawal of the head from the cavity.

In addition to one or more of the features described above, or as an alternative, the sleeve may overlap a region of the head having the maximum outer diameter.

In addition to one or more of the features described above, or as an alternative, the sleeve may comprise a shoulder which extends radially inward around the stem adjacent the join of the stem to the head.

In addition to one or more of the features described above, or as an alternative, the sleeve may comprise an elongate region extending from the shoulder along the stem.

In addition to one or more of the features described above, or as an alternative, the cavity may taper from the sealed end towards where it narrows at the open end to define a frusto-conical inner surface of the shell.

In addition to one or more of the features described above, or as an alternative, the expander may comprise a ball or bullet shaped member.

In addition to one or more of the features described above, or as an alternative, the shell may include one or more circumferentially extending grooves in the circumferential wall.

In addition to one or more of the features described above, or as an alternative, the sleeve may be made of the same material as the shell.

In addition to one or more of the features described above, or as an alternative, the expander may be made of a harder material than the sleeve and/or shell.

FIGURES

Certain exemplary embodiments will now be described in greater detail by way of example only and with reference to the accompanying figures, in which.

Figure 4A:
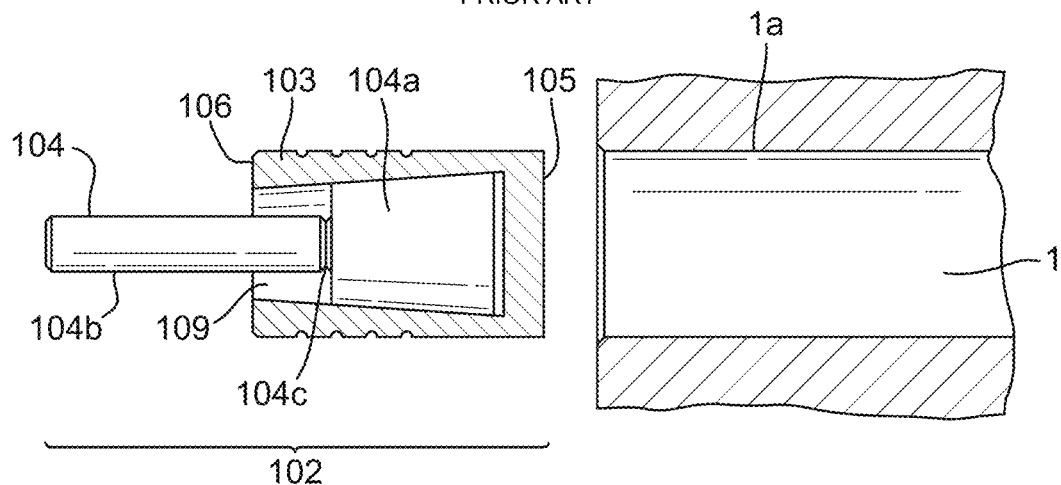
Figure 4B:
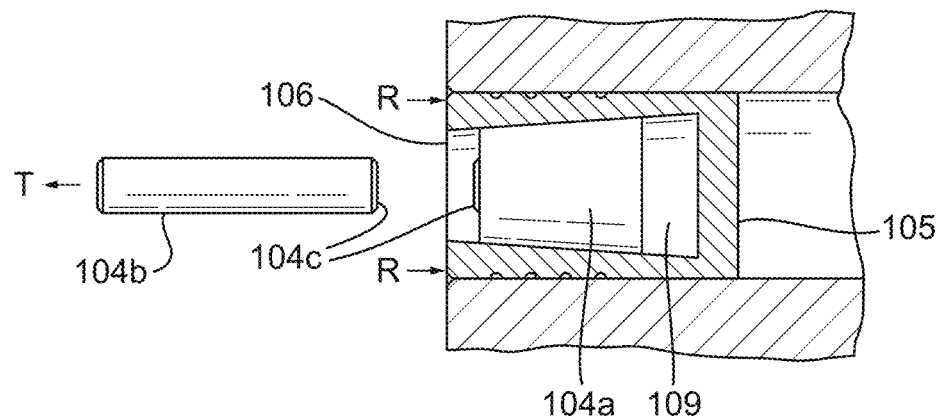
Figure 5A:
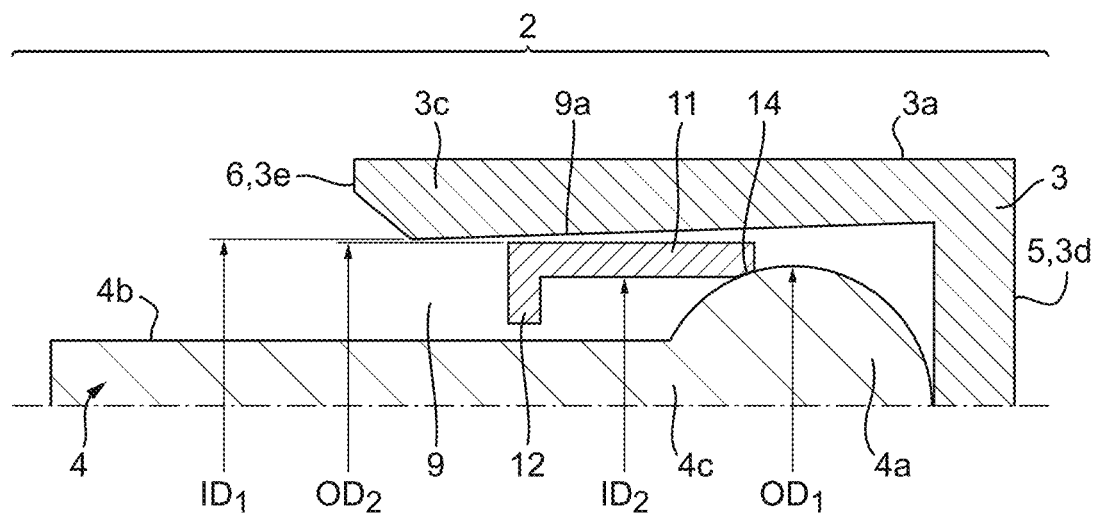
Figure 5B:
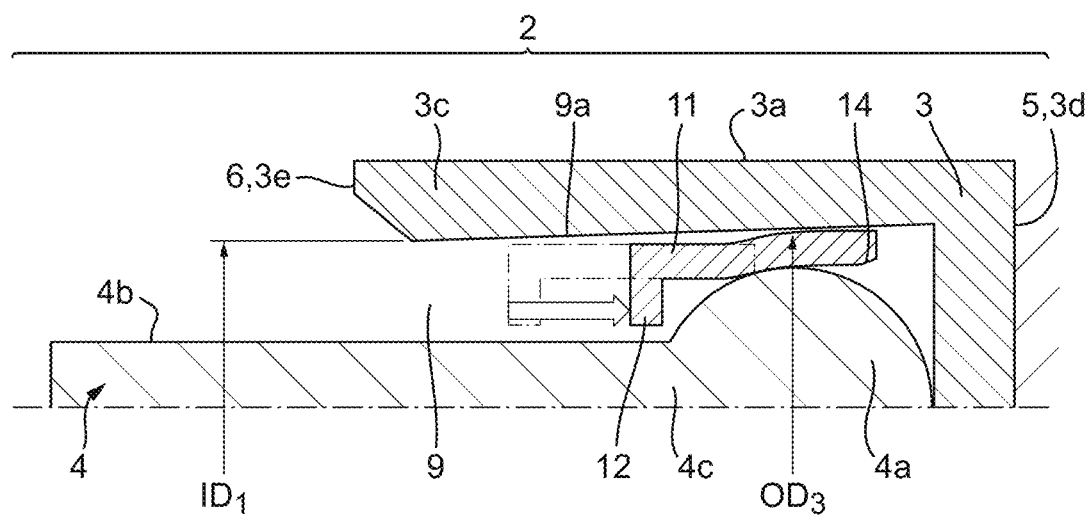
Figure 5C:
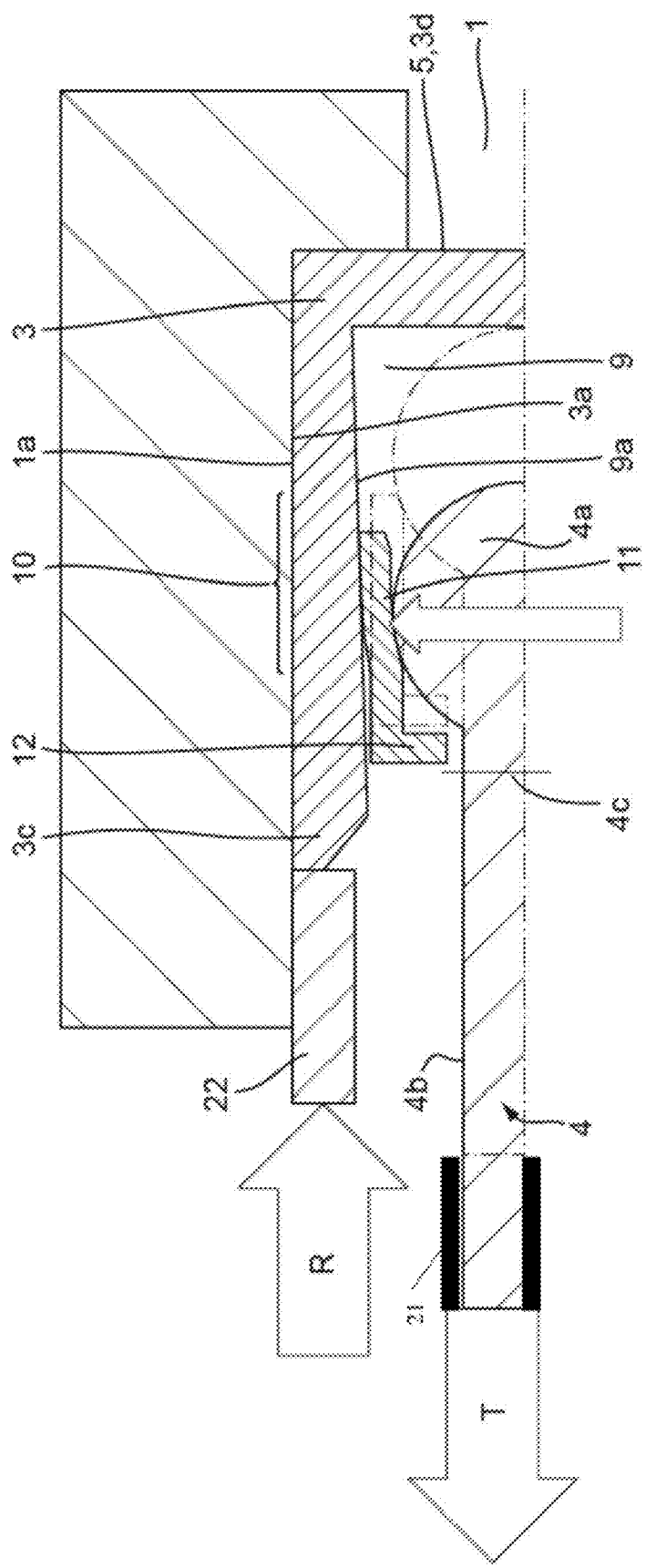
Figure 6:
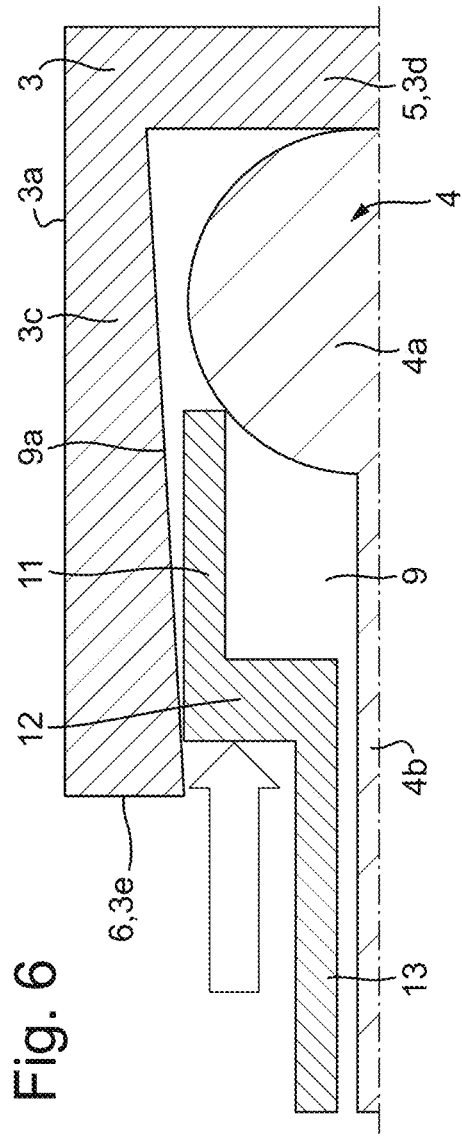
Figure 7:
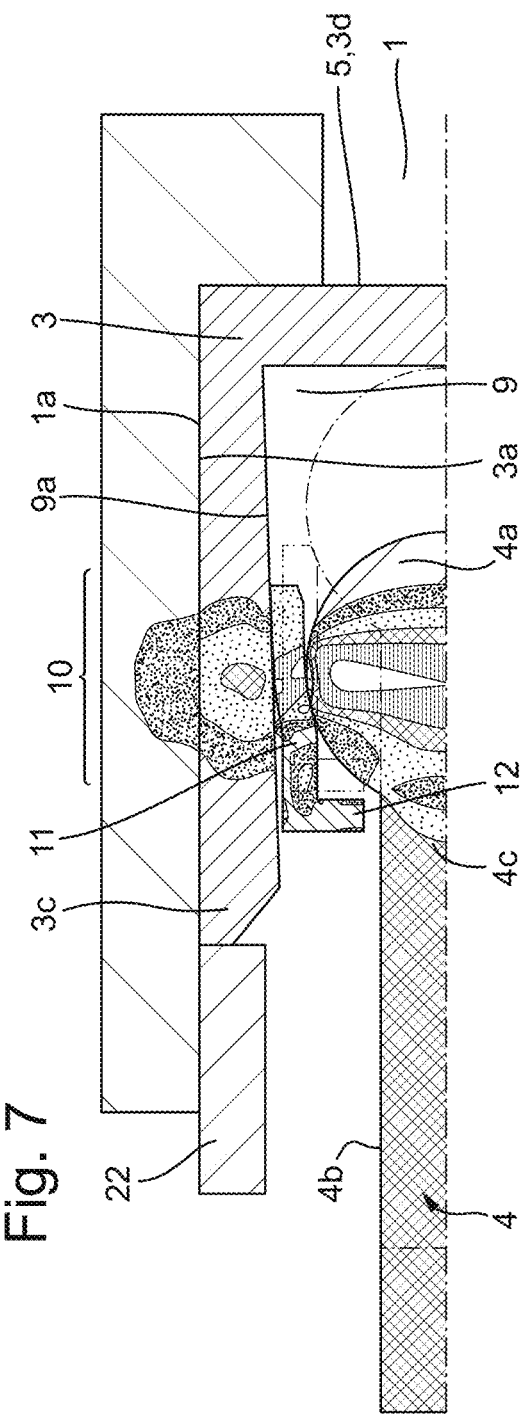
Figure 8A:
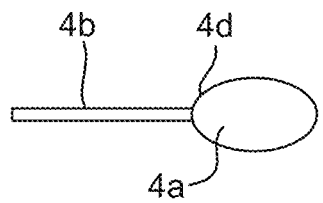
Figure 9:
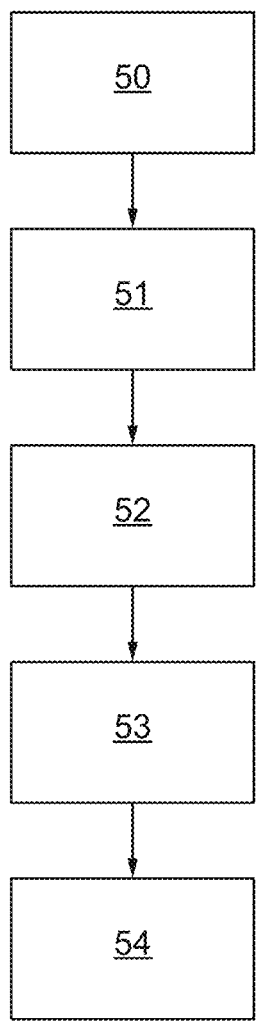

FIGS. 4A and 4B are cross-sectional representations illustrating an expanding plug described in U.S. Pat. No. 3,525,365;

FIGS. 5A, 5B and 5C are cross-sectional representations of an exemplary hydraulic plug in accordance with the present disclosure during its manufacture and ready for installation within a passage;

FIG. 6 is a cross-sectional representation illustrating the installation of an alternative hydraulic plug;

FIG. 7 is a schematic partial cross-section through an exemplary hydraulic plug indicating local stress concentrations during installation in a hydraulic device;

FIGS. 8A through to 8F are cross-sectional representations of examples of different shapes of expander which could be used in the hydraulic plug; and FIG. 9 is a schematic flow diagram illustrating the manufacture of a hydraulic plug.

DETAILED DESCRIPTION

Figure 1A:
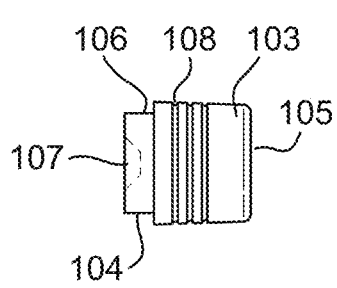
FIG. 1A and FIG. 1B are cross-sectional representations illustrating a first known example of a hydraulic plug.
Figure 1B:
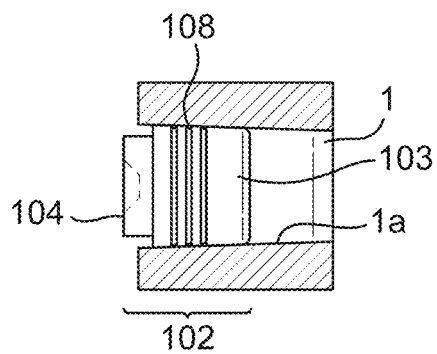

FIGS. 1A and 1B illustrate cross-sectional views of a first main type of known hydraulic plug, with FIG. 1A illustrating the plug prior to insertion and FIG. 1B illustrating the plug after insertion.

FIG. 1B shows a passage 1 in a hydraulic gallery which has been reamed to form a tapered internal surface 1a for receiving the hydraulic plug 102. The plug 102 comprises two parts; an outer part in the form of a shell 103 and an inner part in the form of an expander 104 or "pin". The outer surface of the shell 103 is tapered to correspond to the tapered internal surface 1a of the passage 1. The circumferential wall of the shell 103 is of constant thickness. The shell 103 has a sealed end 105 and an open end 106, with the open end 106 being of larger external diameter than the sealed end 105. The expander 104 comprises a central dimple 107 on its driven end for engagement with a driver tool (not shown). The shell 103 comprises a set of circumferential grooves 108 which aid the sealing property of the shell 103.

Figure 2:
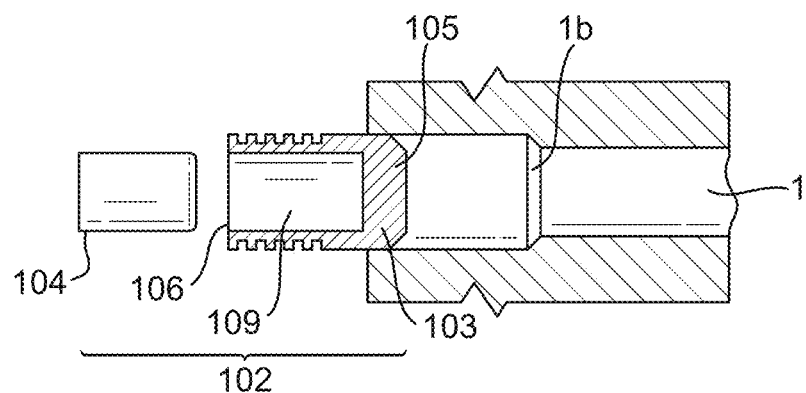
FIG. 2 is a cross-sectional representation illustrating a second known example of a hydraulic plug.

FIG. 2 is an exploded cross-sectional view of a second type of known hydraulic plug 102. In this known example, the passage 1 of the hydraulic gallery is reamed to a constant diameter creating a step 1b where the reamed internal bore meets the passage bore. The hydraulic plug 102 comprises a shell 103 having an outer surface of substantially constant diameter and an expander 104 ("pin"). The shell 103 has a sealed end 105, an open end 106 and a cavity 109 opening to the open end 106. The hydraulic plug 102 is installed in the passage 1 by, first of all, pushing the shell 103 into the passage 1 up to the step 1b and then driving the expander 104 into the cavity 109 of the shell 103, to expand the shell 103 against the internal surface 1a of the passage 1 and seal the hydraulic plug 102 within the passage 1 of the gallery.

Figure 3:
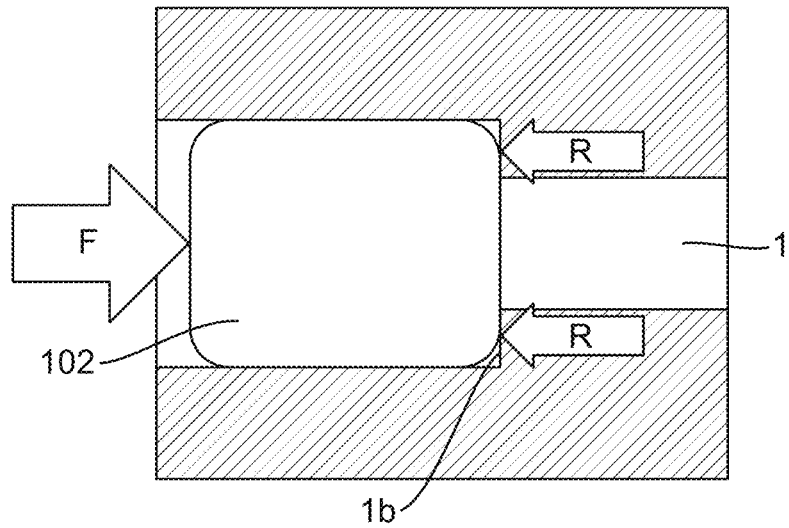
FIG. 3 is a cross-sectional representation illustrating forces and loads within a passage with a known hydraulic plug.

FIG. 3 is a schematic representation illustrating the forces associated with installing a hydraulic plug 102 in a passage 1. Where the plug 102 abuts an internal step 1b of the passage 1, the installation force F generates a counter reaction load R around the edge of the plug 103. Due to the small contact area, the loading in this region can be quite high. As a result, the design of the hydraulic component needs to take into consideration that the axial forces during installation need to be balanced. This can introduce complexity into the design and there is also potential for the high loads to result in material cracking.

FIG. 4A is a cross-sectional view of an expanding plug taught in U.S. Pat. No. 3,525,365 prior to installation and FIG. 4B is a cross-sectional view showing the plug in place within a passage 1.

As can be seen in FIG. 4A, the known expanding plug 102 comprises a cylindrical shell 103 of outer diameter corresponding to the internal diameter of the passage 1. The shell 103 has a cavity 109 with a tapered internal surface which gradually constricts from a sealed end 105 towards the open end 106. The internal surface of the cavity 109 defines a frusto-conical surface for engagement with an expander 104.

During installation, as shown in FIG. 4B, the plug 102 is inserted into the passage 1 with the sealed end 105 facing the pressure-side, and then once in place, a tensile force T is applied to the stem 104b to draw the head 104a towards the constricted open end 106 of the shell 103. As the head 4a wedges with increasing force against the tapered inner surface of the shell 103, it expands the outer surface of the shell 103 into sealing contact with the internal surface 1a of the passage 1. There will come a point when the tensile force T matches the predetermined fracture load of the weakened region 104c, causing the expander 104 to break where the stem 104b was joined to the head 104a.

With the advent of modern hydraulic devices, higher performance sealing is required. In addition, it would be desirable to make the manufacture of the plug parts and the complete hydraulic plug cheaper. The present disclosure may be seen as providing a solution which goes some way to meeting these desires.

FIG. 5A illustrates a cross-section through an exemplary embodiment of a hydraulic plug 2 of the present disclosure during an initial stage of manufacture. The hydraulic plug 2 is generally cylindrical in form and comprises a shell 3 which has a circumferential wall 3c, a sealed end 5 (provided by end wall 3d), an open end 6 (provided by opening 3e) and a cavity 9 opening to the open end 6. The cavity 9 extends axially within the shell 3 and is defined by a tapered internal surface 9a of the shell 3 that narrows from the sealed end 5 to the open end 6. The cavity 9 has a minimum inner diameter $ID_1$ at this narrowing towards the open end 6.

The hydraulic plug 2 also comprises an expander 4, and in the case of the FIG. 5A embodiment, an expander 4 having a spherical head 4a (of a diameter $OD_1$, less than the minimum inner diameter $ID_1$ of the cavity 9) and an elongate stem 4b connected to the head 4a. The stem 4b extends from the open end 6 of the shell 3 in an axial direction for applying a tensile force (T). The expander 4 may comprise a weakened region 4c where the stem 4b joins to the head 4a, in order to promote fracturing in this region when a predetermined tensile force is applied to the stem 4b.

Additionally, the hydraulic plug 2 comprises a sleeve 11 that extends in an axial direction within the cavity 9, the sleeve 11 having an outer diameter $OD_2$ which is less than or equal to the minimum inner diameter $ID_1$ of the cavity 9, in order to allow it to be inserted easily. The sleeve 11 has an inner diameter $ID_2$ which is less than the maximum outer diameter $OD_1$ of the expander head 4a, at least at its end adjacent the head 4a.

The sleeve 11 may also have a shoulder 12 which extends radially inward around the stem 4b, for example, as shown in FIG. 5A. The shoulder 12 may help to resist pullout of the head 4a by pulling the sleeve 11 with the head of the expander 4 towards narrower inner diameter regions of the cavity 9 where the expanding force on the circumferential wall 3c of the shell 3 increases.

The shell 3 may comprise any material suitable for mechanical seals in hydraulic devices, the choice of which may depend on the material of the device that it is being installed in (e.g., for compatibility). Metals like stainless steels, aluminium alloys, titanium alloys, etc., may be chosen accordingly. The chosen metal should also offer suitable corrosion resistance and ductility during forming. The sleeve 11 may comprise a material of the same ductility and coefficient of thermal expansion as the shell 3. The sleeve 11 may therefore comprise the same material as the shell 3.

By way of example only, exemplary alloys for the shell 3 could be ductile stainless steels like AISI 300 series or 416. The sleeve 11 may comprise the same or similar materials. The expander 4 may comprise a harder stainless steel like A304 or A286. Alternatively, the expander 4 may comprise a softer material than the sleeve 11 and/or shell 3. The present disclosure is not in any way limited to these materials.

During manufacture, the expander 4 is inserted head first, into the cavity 9 of the shell 3, as shown in FIG. 5A. With the head 4a of the expander 4 in place within the cavity 9, the sleeve 11 is inserted into the cavity 9 from the stem side of the head 4a and may form a tight fit between the expander 4 and circumferential wall 3c of the shell 3. The sleeve 11 may also be provided on the stem 4b initially and inserted into the cavity 9 with the expander 4.

Prior to installation of the plug 2 in a passage of a hydraulic body, a sleeve 11 forming step is performed, in which the sleeve 11 is deformed, for example, plastically deformed. A force is applied to the sleeve 11 and/or expander 4 in an axial direction so as to urge the sleeve 11 into the gap between the head 4a and the circumferential wall 3c. For example, the end of sleeve 11 may be forced over the head 4a of the expander 4 by pushing the sleeve 11 axially against the head 4a. Alternatively, the head 4a may be drawn towards the end of the sleeve 11 by applying a tensile force T to the stem 4b in a direction to withdraw the head 4a from the cavity 9. The sleeve forming step may also comprise a combination of these two, where the sleeve 11 is pushed towards the sealed end 5 of the shell 3 and the head 4a is pulled towards the open end 6. An internal distal edge of the sleeve 11 may be chamfered 14 to guide the head 4a of the expander 4 into the sleeve 11.

This sleeve forming step deforms the sleeve 11 and causes it to overlap a region of the head 4a, in particular it may overlap with the widest part of the head 4a, so that the outer diameter $OD_2$ of the sleeve 11 is enlarged ($OD_3$) to become greater than the inner diameter $ID_1$ of the shell 3 at the open end 6. The combined outer diameter where the deformed sleeve 11 encapsulates the head 4a of the expander 4, being larger than the minimum inner diameter $ID_1$ of the cavity where it narrows towards the open end 6, retains the head 4a within the cavity 9, preventing its withdrawal. This is shown in FIG. 5B.

Thus the outer diameter of the deformed sleeve 11 encapsulating the widest part of the expander 4 is less than or equal to the value of the maximum outer diameter plus the thickness of the sleeve (the outer diameter of the undeformed sleeve 11 minus the inner diameter of the undeformed sleeve), and the combined outer diameter $OD_3$ of the sleeve 11 plus the head 4a is greater than the inner diameter $ID_1$ of the shell 3 at the open end 6.

FIG. 5C shows a final stage where the hydraulic plug of FIG. 5B is being installed within a passage of a hydraulic device.

To install the hydraulic plug 2 within a passage 1 of a hydraulic gallery, the hydraulic plug 2 is inserted within a passage 1 of substantially the same diameter (i.e., either the same or very slightly smaller diameter). Once in place, a central part 21 of a tool is used to apply a tensile force T on the stem 4b of the expander 4 (pulling the expander out of the cavity) while at the same time an outer part 22 applies a counter resistance load R to the open end 6 of the shell 3. The stem 4b may be provided with grooves, ridges or some other form of relief (not shown) to aid gripping by the tool. The stem 4b may comprise a rod or wire of metal.

The tensile force T draws the head 4a of the expander 4 and the overlapping sleeve 11 against the narrowing internal surface 9a of the circumferential wall 3c of the shell 3. This forces the outer surface 3a of the shell 3 against the internal surface 1a of the passage 1 across a local region 10 where the sleeve 11 acts on the internal surface 9a of the shell 3, e.g., as indicated by the arrows in FIG. 5C. At a certain point when the tensile force T applied by the central part 21 of tool matches the predetermined breaking load of the expander 4, the stem 4b snaps away from the head 4a, to leave the hydraulic plug 2 sealed within the passage 1 of the hydraulic gallery. Thus the head 4a of the expander 4 and the sleeve 11 remain trapped within the shell 3 during use of the hydraulic device.

During this installation process, as the head 4a and sleeve 11 are drawn towards the open end 6, the sleeve 11 urges against the circumferential wall 3c, deflecting the shell 3 outwardly (causing the outer surface 3a to be urged against the internal surface of the passage 1). Moreover, this action causes the material of the shell 3 to become ironed against the internal surface 1a of the passage 1 in this local region 10, and in so doing, creating strong sealing engagement with the passage 1. FIG. 7 indicates local stress concentrations during installation of the hydraulic plug 2. The varying levels of stress are indicated by the different shaded regions. A relatively low level of stress is concentrated in the hydraulic body.

One benefit of the provision of the sleeve 11 is that there is no longer a need for the careful and consistent machining required in the known system to match the conical surfaces of the shell and the expander; instead, the manufacturing of the sleeve 11 and expander 4 can be achieved much more simply and in a cost-effective manner.

A second exemplary embodiment of the hydraulic plug 2 is described in FIG. 6. In this embodiment, the sleeve 11 has an elongate region 13 that extends out of the open end 6 of the shell 3 in an axial direction. The elongate region 13 protrudes from the shoulder 12 of the sleeve 11. This elongate region 13 can be used to more easily apply a force to the sleeve 11 in order to urge the sleeve 11 between the head 4a and the circumferential wall 3c prior to installation of the plug 2.

FIGS. 8A through to 8F illustrate cross-sectional representations of different examples of expander shape for hydraulic plugs 2. These are in no way intended to be limiting, but rather illustrates the range of shapes that might be possible.

Figure 8B:
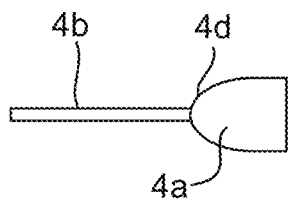
Figure 8C:
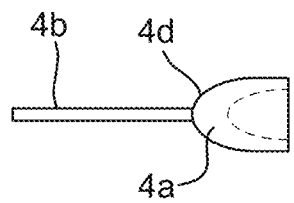
Figure 8D:
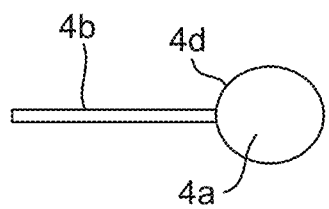
Figure 8E:
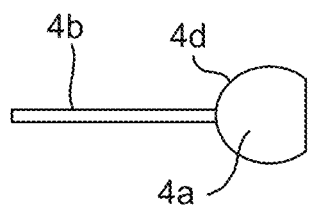
Figure 8F:
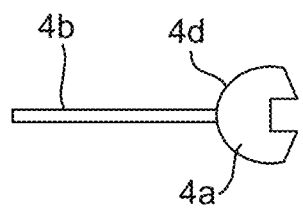

FIG. 8A shows an ovaloid, ball-shaped member providing the expander head 4a. The face closest to the stem 4b defines a convex contact surface 4d which is rounded in an axial direction of the expander 4 (and hence axial direction of the cavity 9). FIG. 8B illustrates a head 4a having the same convex contact surface 4d which blends into a cylindrical flattened end, to define a more bullet-shaped member. FIG. 8C illustrates the same head shape as FIG. 8B but with a cavity in the end furthest from the stem 4b. FIG. 8D illustrates a spherical, ball-shaped member for the head 4a. FIG. 8E illustrates a spherical-shaped member having a flattened surface remote from the stem 4b. FIG. 8F illustrates a modified spherical-shaped member with a groove in a surface remote from the stem 4b.

Additional variations of such shapes and combinations of features are also envisaged and are encompassed within this disclosure. The common feature with all of these embodiments is that the contact surface 4d of the head 4a of the expander 4 is convex and rounded in the axial direction of the cavity/expander. As the contact surface 4d is drawn towards the sleeve 11, it will force the sleeve 11 between the head 4a and the circumferential wall 3c, deforming the sleeve 11. Thus, as the expander 4 and the sleeve 11 are drawn towards the open end 6 of the shell, due to the narrowing of the cavity, a radial force will be applied to the shell 3 sealing the shell 3 within the passage 1.

FIG. 9 is a schematic flow diagram illustrating the steps of manufacturing and installing the hydraulic plug. In step 50, an expander 4 is inserted head first into a cavity 9. The head 4a is smaller than the narrowest part of the cavity 9, and when fully inserted, a gap is present between the head 4a and the internal surface 9a of the shell 3. Either in step 50 or in a subsequent step 51, a sleeve 11 is introduced into the cavity 9 and forced against the head 4a, which is of larger diameter than the end of the sleeve 11. In step 52, the sleeve forming step, the sleeve 11 is deformed, for example, plastically deformed, by the head 4a being pushed into the end of the sleeve 11. This expands the outer diameter of the sleeve 11 locally where it encapsulates and overlaps with the maximum outer diameter of the head 4a, making it of a size which is then too big to fit through the narrowing of the cavity present towards its open end 6, preventing the removal of the head 4a from the cavity 9. The head 4a, in step 53, becomes wedged in the sleeve 11 which in turn is wedged against the tapering internal surface 9a of the shell 3. The greater the tensile force T which is applied to the stem 4b, the more secure the plug becomes within the passage. At step 54, the tensile force T reaches a level where a weakened region 4c of the stem 4b fractures and the stem 4b separates from the head 4a, leaving the hydraulic plug sealing the passage.

At least in the illustrated embodiment, it can be seen that manufacturing costs can be reduced through avoiding the need for matching tapered surfaces on the shell and expander. Improved sealing may also be achieved in order to meet the demands of modern hydraulic galleries. The tensile and reaction forces during installation can be balanced to avoid complications with the design of the device.

The invention claimed is:

1. A method of manufacturing a hydraulic plug comprising:
   providing a shell comprising a circumferential wall, a sealed end, an open end and an axially extending cavity within, the cavity being defined by an internal surface with an inner diameter which narrows towards the open end;
   inserting a head of an expander into the cavity, the expander further comprising a stem extending from the cavity for applying a tensile force (T) to the head,
   wherein a sleeve is provided on a stem side of the head extending into the cavity, an end of the sleeve adjacent the head having an inner diameter ($ID_2$) which is less than a maximum outer diameter ($OD_1$) of the head and wherein the sleeve is made of the same material as the shell; and
   a sleeve forming step in which the sleeve is expanded by forcing the head into the end of the sleeve through urging the sleeve and/or expander towards the other in an axial direction, causing the end of the sleeve to plastically deform and the sleeve to overlap a region of the head to present a combined outer diameter ($OD_3$) which is greater than a minimum inner diameter ($ID_1$) of the cavity where the cavity narrows towards the open end, thereby preventing withdrawal of the head from the cavity.

2. A method as claimed in claim 1, wherein the sleeve is expanded into abutment with the internal surface of the cavity, causing the expander to become wedged by the sleeve within the cavity, ready for use.

3. A method as claimed in claim 1, wherein the method comprises inserting the end of the sleeve into the cavity after the head of the expander has been inserted into the cavity.

4. A method as claimed in claim 3, wherein during the sleeve forming step, the head of the expander is drawn towards the sleeve to expand the sleeve around the head.

5. A method as claimed in claim 3, wherein during the sleeve forming step the end of the sleeve is moved towards the head to expand the sleeve around the head.

6. A method as claimed in claim 1, wherein the sleeve is caused to overlap a region of the head having the maximum outer diameter ($OD_1$) and wherein the cavity extends axially a distance greater than the axial extent of the head, and the method includes pulling the head of the expander away from the sealed end of the shell towards the open end of the shell and into the end of the sleeve to expand the sleeve locally by creating the overlap.

7. A method as claimed in claim 1, wherein the shell has a cylindrical outer form and is for installation in a body having a hydraulic passage of constant diameter.

8. A hydraulic plug comprising:
a shell comprising a circumferential wall, a sealed end, an open end and an axially extending cavity opening to the open end, the cavity being defined by an internal surface with an inner diameter which narrows towards the open end;
an expander having a head retained within the cavity of the shell and a stem joined to the head and extending from the cavity for applying a tensile force (T) to the head; and
a sleeve provided between the head and the internal surface of the shell, wherein the sleeve is made of the same material as the shell, and wherein the sleeve has an end which has been plastically deformed over the head, the sleeve then overlapping a region of the head to present a combined outer diameter ($OD_3$) which is greater than a minimum inner diameter $ID_1$ of the cavity where the cavity narrows towards the open end, thereby preventing withdrawal of the head from the cavity.

9. A hydraulic plug as claimed in claim 8, wherein the sleeve overlaps a region of the head having a maximum outer diameter ($OD_1$).

10. A hydraulic plug as claimed in claim 8, wherein the sleeve comprises a shoulder which extends radially inward around the stem adjacent the join of the stem to the head, and wherein the sleeve comprises an elongate region extending from the shoulder along the stem.

11. A hydraulic plug as claimed in claim 8, wherein the internal surface of the shell is frusto-conical.

12. A hydraulic plug as claimed in claim 8, wherein the expander comprises a ball or bullet shaped member.

13. A hydraulic plug as claimed in claim 8, wherein the shell includes one or more circumferentially extending grooves in the circumferential wall.

14. A hydraulic plug as claimed in claim 8, wherein the expander is made of a harder material than the sleeve.

* * * * *